United States Patent [19]

Shimomiti et al.

[11] 3,898,385

[45] Aug. 5, 1975

[54] AUTOMATIC TELEPHONE ANSWERING APPARATUS

[75] Inventors: Makoto Shimomiti; Tadahisa Iwasaki; Tateki Ueda, all of Tokorozawa, Japan

[73] Assignee: Pioneer Electronic Corporation, Tokyo, Japan

[22] Filed: July 9, 1973

[21] Appl. No.: 377,353

[30] Foreign Application Priority Data

July 7, 1972 Japan ............................... 47-68045

[52] U.S. Cl. ................................ 179/6 R; 179/6 E

[51] Int. Cl. ........................................... H04m 1/64

[58] Field of Search ............ 179/6 R, 6 E; 242/191

[56] References Cited

UNITED STATES PATENTS

| | | | |
|---|---|---|---|
| 3,250,856 | 5/1966 | Muller | 179/6 R |
| 3,293,365 | 12/1966 | Mitsui | 179/6 R |
| 3,488,017 | 1/1970 | Schatteman | 242/191 |
| 3,730,997 | 5/1973 | Konno | 179/6 R |

*Primary Examiner*—Bernard Konick
*Assistant Examiner*—Stewart Levy
*Attorney, Agent, or Firm*—Sughrue, Rothwell, Mion, Zinn & Macpeak

[57] ABSTRACT

A logic circuit which detects the fact that an incoming message recorder tape in a telephone answering apparatus is full and causes the tape drive to be disabled. The circuit also detects abnormal conditions, such as breaking of the tape or under-speed rotation of either the tape supply or take-up reels. The circuit performs these functions without requiring any special processing or modification of the tape.

3 Claims, 1 Drawing Figure

PATENTED AUG 5 1975 3,898,385
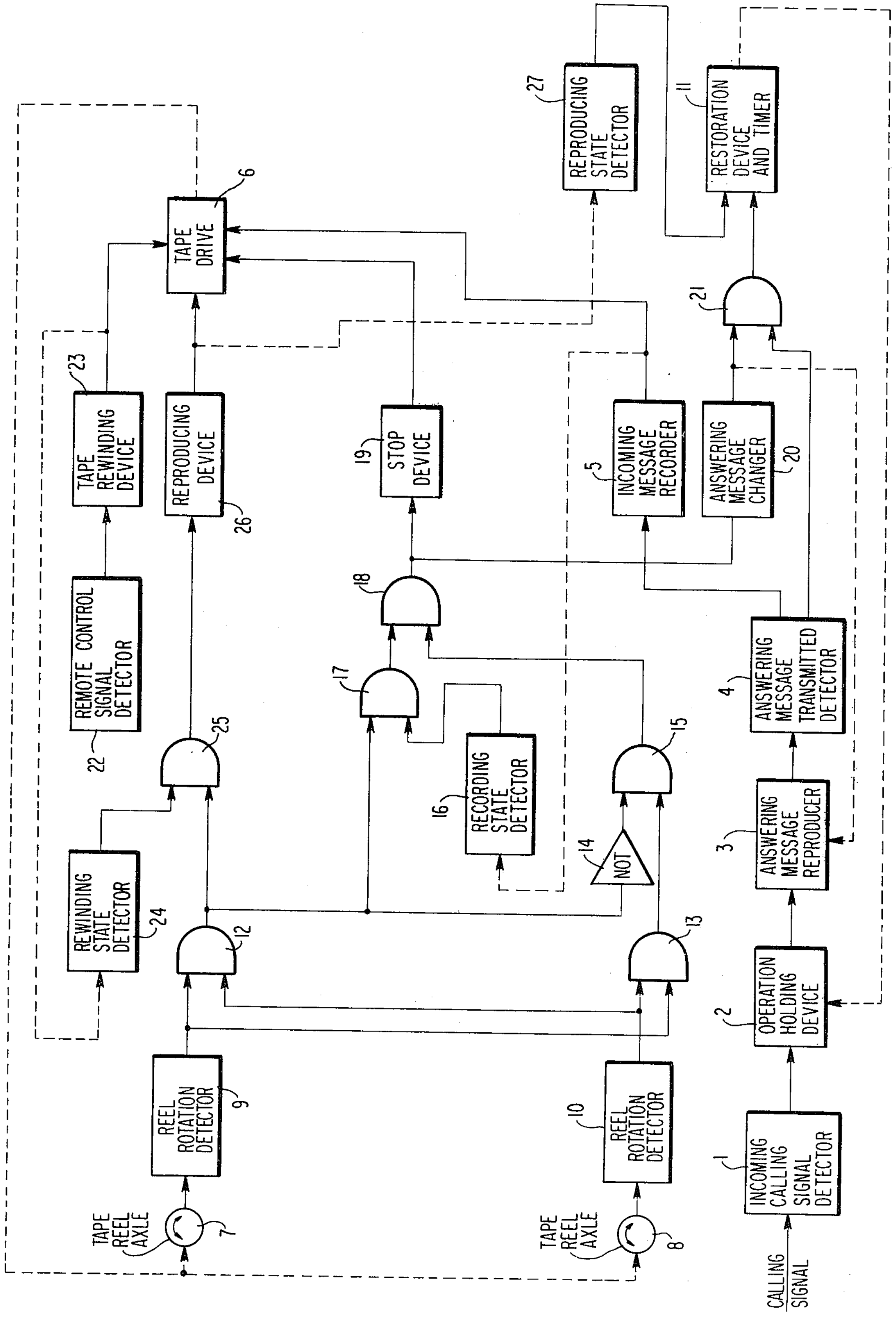

AUTOMATIC TELEPHONE ANSWERING APPARATUS

BACKGROUND OF THE INVENTION

1. Field of the Invention:

This invention relates to automatic telephone answering apparatus, and, more particularly, to an automatic telephone answering apparatus having a protection means for protecting the apparatus from something unusual which occurs in relation to a magnetic recording tape for recording a message incoming from a caller.

2. Brief Description of the Prior Art

In prior art automatic telephone answering apparatus having a reel-to-reel type tape drive mechanism, the following three different means are generally employed in order to deal with the situations in which the recording tape is wound up to its end portion or in which the tape breaks.

The first means comprises a conductive foil fixed to the end portion of the recording tape. When the recording tape is wound up to its end portion, the conductive foil fixed thereto makes a short circuit between contacts; and when the recording tape breaks, a conductive tape pad normally pressing against a pair of electrodes through the recording tape, is pressed directly against the electrodes, in the absence of the tape, to short-circuit the electrodes.

The second means comprises a transparent leader-tape connected to the end portion of the recording tape. When the recording tape is fully wound up to its end portion, a photoelectric element normally shielded from light by the opaque recording tape, is illuminated through the transparent leader-tape by the light from an electric light bulb; and when the recording tape breaks, the photoelectric element is illuminated directly by the light from the electric bulb.

The third means employs a shut-off lever arranged in the winding up path of the recording tape for detecting the end of the tape and stopping the tape drive.

However, the first and second means are disadvantageous because of the lack of durability of the conductive foil and the electric bulb, respectively. The third means is disadvantageous because it cannot be used when there is no space to accommodate the shut-off lever, such as in a cassette tape player, and because of low reliability of operation caused by the force of the spring of the shut-off lever and the tension of the recording tape becoming unbalanced when a tape player is not set horizontally.

SUMMARY OF THE INVENTION

The present invention overcomes the aforementioned disadvantages.

The first object of the present invention is to provide an automatic telephone answering apparatus which is able accurately to detect the end portion of a magnetic recording tape or abnormal conditions thereof without requiring special processing of the magnetic recording tape during the manufacture thereof.

The second object of the present invention is to provide an automatic telephone answering apparatus which detects in any operating state, i.e., recording state, reproducing state or rewinding state, any abnormal condition in which the magnetic recording tape breaks or cannot run at the fixed tape speed due to tape slip, and which disables the tape drive when any such abnormal condition occurs.

The third object of the present invention is to provide an automatic telephone answering apparatus which detects the condition of a magnetic recording tape being wound up to the end thereof in normal recording operation state and prevents breaking of the tape, and which disables the tape drive device upon the detection of this condition.

BRIEF DESCRIPTION OF THE DRAWING

The single FIGURE is a block diagram showing one embodiment of the automatic telephone answering apparatus capable of remote control in accordance with the present invention.

DETAILED DESCRIPTION OF THE PREFERRED EMBODIMENT

Next, an embodiment of an automatic telephone answering apparatus capable of remote control operation in accordance with the present invention will be explained in detail.

A first detecting device 1 generates an output signal to detect an incoming calling signal. An operation holding device 2 holds the whole apparatus in an operating state. An answering message reproducing device 3 starts to operate upon receiving the signal from the operation holding device 2 and transmits an answering message to a calling party. A second detecting device 4 generates an output signal when the entire answering message has been transmitted. An incoming message recording device 5 starts to operate upon receiving the output signal of the second detecting device 4 and records the incoming message from a caller. A tape drive device 6 drives reel axles 7 and 8 for driving the incoming message recording tape. Rotation detecting devices 9 and 10 detect the rotational speeds of reel axles 7 and 8, respectively, and generate electrical output signals when the rotational speeds of their corresponding reel axles become zero or lower than a predetermined speed value. A restoration device 11 includes a timer circuit, which, in general answering-recording operations, restores the operation holding device 2 to its original state after a predetermined timer period.

A first AND circuit 12 generates an output signal only when it receives output signals from both rotation detecting devices 9 and 10. A first OR circuit 13 generates an output signal when it receives an output signal from either of the rotation detecting devices 9 and 10.

A NOT circuit 14 generates an output signal when there is no output signal from the first AND circuit 12. A second AND circuit 15 generates an output signal only when it receives output signals from both the first OR circuit 13 and the NOT circuit 14.

A third detecting device 16, when the apparatus is in the recording state for recording an incoming message from a caller, detects such state and generates an output signal. A third AND circuit 17 generates an output signal only when it receives electric signals from both the first AND circuit 12 and the third detecting device 16. A second OR circuit 18 generates an output signal when it receives a signal from either the second AND circuit 15 or the third AND circuit 17.

A stop device 19 functions to stop the operation of the tape drive device 6.

An answering message change device 20 changes the answering message sent out to a caller. A fourth AND circuit 21 generates an output signal only when it receives signals from both the answering message change device 20 and the second detecting device 4.

A fourth detecting device 22 detects an incoming remote control signal.

A tape rewinding device 23 causes the tape drive device 6 to rewind the magnetic recording tape. A fifth detecting device 24 detects the tape rewinding state of the tape drive device 6. A fifth AND circuit 25 generates an output signal only when it receives electric signals from both the fifth detecting device 24 and the first AND circuit 12.

A reproducing device 26 causes the tape drive device 6 to operate in the reproducing state. A sixth detecting device 27 detects that the message recording tape is in the reproducing state, and also that all recorded incoming messages have been reproduced. Device 27 further suppresses the operation of the restoration device 11 during the time when the message recording tape is in the reproducing state, and releases this suppressing operation when all of the recorded incoming messages have been reproduced. The structure and operation of blocks 1–5, 22, 24 and 27 are disclosed in U.S. Pat. No. 3,730,997, of blocks 9 and 10 in U.S. Pat. No. 3,488,017 and of block 20 in German Pat. No. 1,114,850.

Next, the general answering and recording operations will be explained. When an incoming calling signal is received by the apparatus, the first detecting circuit 1 activates the operation holding device 2, whereby the answering message reproducing device 3 starts a reproduction operation of an answering message. When the answering message has been completely reproduced, the second detecting device 4 detects this condition and activates the incoming message recording device 5, thereby recording the incoming message from a caller. At that time, the tape drive device 6 is controlled by the incoming message recording device 5 and causes the incoming message recording tape to run under recording conditions by driving the reel axles 7 and 8. The rotation of the reels 7 and 8 are respectively detected by means of the rotation detecting devices 9 and 10. The restoration device 11 operates to restore the operation holding device 2 to its initial state after the incoming message recording state has existed for the predetermined time period determined by the timer circuit included in the restoration device 11, whereby the automatic telephone answering apparatus returns to the stand-by state to wait for the next incoming call.

After many repetitions of the above recording operation and when the incoming message recording tape winds up on the take-up reel to the end portion of the tape while an incoming message from a caller is being recorded, both the reel axles 7 and 8 stop rotating. The rotation detecting devices 9 and 10 detect the stopping of the corresponding reels 7 and 8 and send out output signals to the two inputs of the first AND circuit 12. The first AND circuit 12, accordingly, generates an output signal upon receiving the output signals from both rotation detecting devices 9 and 10. The OR circuit 13 at this time generates an output signal, too, but the NOT circuit 14 does not generate an output signal because the output signal from the first AND circuit 12 is denied by the NOT circuit 14, and thus the second AND circuit 15 does not receive a signal on its upper input and, therefore, does not generate an output signal.

However, since the incoming message recording device 5 is still in its operating or recording state, the third detecting device 16 detects such state and is sending out an output signal to the third AND circuit 17. Therefore, the third AND circuit 17 generates an output signal when the output signal from the first AND circuit 12 reaches it. The output signal of the third AND circuit 17 is fed to the second OR circuit 18, and thus the second OR circuit 18 generates an output signal which is fed to both the stop device 19 and the answering message change device 20. The output signal of the stop device 19 is fed to the tape drive device 6 which ceases to transmit rotary power to the reel axles 7 and 8, and thereby causes the incoming message recording tape to stop running. Furthermore, the output signal of the answering message change device 20 controls the answering message reproducing device 3 in order to change reproduction channels of the answering message recorded tape. Namely, the answering tape changes to a second answering message which says that the answering apparatus is capable of only reproducing an answering message because the apparatus is not able to record an incoming message from a caller, and prepares the apparatus to send out this second answering message to subsequent callers. Since the output signal of the answering message change device 20 is also fed to the fourth AND circuit 21, the fourth AND circuit 21 will have already generated an output signal to operate the restoration device 11 upon having received an output signal from the second detecting device 4, because the operation of the answering message recorded tape will have been already finished before start of the recording operation. The restoration device 11 causes the operation holding device 2 to return to its original state and thereby the answering apparatus to return to the stand-by state to wait for the next call.

Further, when a new calling signal is received by the apparatus, the answering message recorded tape runs through the same operations as above-mentioned, but since the import of the answering message is already changed, the only message sent out by the apparatus is that the subscriber is away from home, and thus the apparatus does not send out a message saying that it will record the caller's message. When the reproduction of the answering message is completed, the second detecting device 4 detects such condition and sends out an output signal to the fourth AND circuit 21. Since the answering message change device 20 has already completed the changing operation and so is generating an output signal, the fourth AND circuit 21 generates an output signal. Upon receiving this output signal, the restoration device 11 operates to restore the operation holding device 2 in order to restore the apparatus to the stand-by state.

In the normal answering and recording operation states, either one of the reel axles 7 or 8 may stop rotating or may rotate at a speed lower than a predetermined rotational speed value. These situations may be caused by such abnormal conditions as breaking of the incoming message recording tape or running of the tape below the predetermined speed during the recording of an incoming message from a caller.

Such abnormal conditions are detected by means of the rotation detecting devices 9 and 10, an output signal from either one of which will cause the first OR circuit 13 to generate an output signal. However, in this case the NOT circuit 14 generates an output signal because the first AND circuit 12 does not generate an output signal. Therefore, the second AND circuit 15 and the second OR circuit 18 generate output signals together, and thereby activate the stop device 19 into operation to stop the incoming message recording tape as well as to activate the answering message change device 20. Since the operations after the second OR circuit 18 generates an output signal are the same operations as those for the case in which the incoming message recording tape was wound up to its end portion, the explanations thereof will be omitted.

Next, the remote control operation will be explained below. When the subscriber or the owner of the answering apparatus calls his telephone from a remote place, the first detecting device 1 detects its calling signal to start normal answering operation in the same manner as when other callers call his telephone. Namely, the answering message is reproduced and sent out. Then, the apparatus changes to the recording operation state after sending-out of the answering message. At that time, when the subscriber sends out a special signal to his telephone through the telephone line, this signal (a remote control signal) is detected by means of a fourth detecting device 22, which activates the tape rewinding device 23 in order to change the tape drive device 6 to the tape rewinding operation state. The fifth detecting device 24 detects such rewinding operation state and sends out an output signal to the fifth AND circuit 25. Because of the tape rewinding operation by the tape drive device 6, the reel axles 7 and 8 rotate to rewind the incoming message recording tape. Both of the reel axles 7 and 8 stop rotating when the rewinding of the tape is completed, and thus the first AND circuit 12 generates an output signal. Therefore, the fifth AND circuit 25 generates an output signal, since it receives as inputs both of the output signals from the fifth detecting device 24 and AND circuit 12, thereby activating the reproducing device 26. The tape drive device 6 is changed to the reproducing operation state by the activation of the reproducing device 26, and then all the incoming messages already received and recorded from many callers are reproduced in order and sent out to the caller (the owner of the apparatus) through the telephone line. The sixth detecting device 27 detects that the reproducing device 26 is in the operation state. During this detecting operation, the sixth detecting device 27 controls the restoration device 11 in order not to restore the operation of the operation holding device 2 to its original state. Therefore, the operation holding device 2, during the reproducing operation of the recorded incoming messages, is able to hold the whole apparatus in the operation state, independently of the timer circuit of the restoration device 11. The sixth detecting device 27 also detects whether any incoming message is recorded on the incoming message recording tape or not. At the time when all of the incoming messages received and recorded are reproduced, the sixth detecting device 27 detects such state, and causes the whole apparatus to return to the stand-by state to wait for next incoming new calls, by activating the restoration device 11.

In each state of rewinding and reproducing under such remote controlled operations, operation conditions or states of the apparatus, such as the incoming message recording tape breaking, being completely rewound, or slipping, are reliably detected in the same manner as in the general answering and recording operations.

As explained above, the present invention improves the security of an automatic telephone answering apparatus used in absence of a manager, especially the security of the apparatus capable of remote control. Exemplary reel rotation detectors are disclosed in U.S. Pat. Nos. 3,647,989 and 3,642,226.

While the invention has been particularly shown and described with reference to the preferred embodiment thereof, it will be understood by those skilled in the art that various changes in form and details may be made therein without departing from the spirit and scope of the invention.

We claim:

1. An automatic telephone answering apparatus comprising:

a. tape drive means for driving a magnetic recording tape for recording a message incoming from a caller,
b. a pair of rotation detecting means for respectively generating output signals when the rotational speeds of a supply reel means and a take-up reel means, both of which are driven by said tape drive means, become zero or lower than a predetermined speed value,
c. first AND circuit means for generating an output signal only when both said rotation detecting means generate output signals,
d. first OR circuit means for generating an output signal when at least one of said rotation detecting means generates an output signal,
e. second AND circuit means for generating an output signal only when said first OR circuit generates an output signal in the absence of an output signal from said first AND circuit,
f. third AND circuit means for generating an output signal only when said first AND circuit generates an output signal and said magnetic recording tape is in a recording state,
g. second OR circuit means for generating an output signal when at least one of said second and third AND circuit means generates an output signal, and
h. stop means responsive to an output signal from said second OR circuit means for disabling said tape drive means, thereby stopping the driving of said take-up reel.

2. An automatic telephone answering apparatus as defined in claim 1, further comprising answer message reproducer means for normally sending out a first recorded answer message in response to an incoming calling signal, and answer message changer means responsive to the output signal from said second OR circuit means for causing said answer message reproducer means to send out a second recorded answer message.

3. An automatic telephone answering apparatus as defined in claim 1, further comprising:

a. remote control signal detector means for receiving a special remote control signal from a caller and producing a special output signal in response thereto;
b. means responsive to said special output signal for causing said tape drive means to rewind the magnetic recording tape having incoming caller messages recorded thereon;

c. rewind state detector means responsive to the rewinding to generate a rewind state output signal;
d. additional AND circuit means responsive to the coincidence of said rewind state output signal and said output signal from said first AND circuit means for generating a reproduce signal; and
e. means responsive to said reproduce signal to cause said tape drive means to operate in the reproducing state, whereby the messages recorded on said magnetic recording tape are reproduced.

* * * * *